United States Patent [19]

Kishi et al.

[11] Patent Number: 4,559,601
[45] Date of Patent: Dec. 17, 1985

[54] NUMERICALLY CONTROLLED CUTTING METHOD

[75] Inventors: Hajimu Kishi, Hino; Masaki Seki, Tokyo; Kunio Tanaka, Hachioji, all of Japan

[73] Assignee: Fanuc Ltd., Minamitsuru, Japan

[21] Appl. No.: 451,145

[22] PCT Filed: Apr. 5, 1982

[86] PCT No.: PCT/JP82/00104
§ 371 Date: Dec. 1, 1982
§ 102(e) Date: Dec. 1, 1982

[87] PCT Pub. No.: WO82/03474
PCT Pub. Date: Oct. 14, 1982

[30] Foreign Application Priority Data

Apr. 4, 1981 [JP] Japan ................................ 56-050967

[51] Int. Cl.⁴ ........................................... G05B 19/403
[52] U.S. Cl. .................................... 364/475; 364/168; 364/170; 318/570; 318/572; 219/69 W
[58] Field of Search ............... 364/168, 169, 170, 474, 364/475; 318/570, 572, 573; 219/69 W

[56] References Cited

U.S. PATENT DOCUMENTS

| 4,355,223 | 10/1982 | Inoue et al. | 219/69 W |
| 4,363,948 | 12/1982 | Itoh | 219/69 W |
| 4,363,949 | 12/1982 | Pfau et al. | 219/69 W |
| 4,431,896 | 2/1984 | Lodetti | 219/69 W |

Primary Examiner—Jerry Smith
Assistant Examiner—Allen MacDonald
Attorney, Agent, or Firm—Staas & Halsey

[57] ABSTRACT

There is disclosed a numerically controlled cutting method of cutting a curved surface SF generated by interconnecting corresponding points mi, ni (i=1, 2, ...) on two curved lines CV1, CV2 with a cutter BT of a milling machine having simultaneously controlled five axes or a wire electrode of a wire-cut electric discharge cutting machine. According to the numerically controlled cutting method, curve information specifying the two curved lines CV1, CV2, information on tool radius or wire radius, information on the direction of tool or wire compensation, and division information for dividing the curved lines are supplied as inputs. Using the above items of information an offset position at dividing points mi, ni, which are next to dividing points mi-1, ni-1 at which the cutter BT or wire is currently positioned, is determined. The cutter BT or wire is then moved to the offset position to cut the curved surface SF.

7 Claims, 15 Drawing Figures

NUMERICALLY CONTROLLED CUTTING METHOD

BACKGROUND OF THE INVENTION

The present invention relates to a numerically controlled cutting method, and more particularly to a numerically controlled cutting method of cutting a curved surface generated by connecting corresponding points on two curved lines with a milling machine or a wire-cut electric-discharge cutting machine.

Wire-cut electric-discharge cutting machines have upper and lower guides and a wire extending therebetween and kept taut for producing an electric discharge between the wire and a workpiece to cut the latter. The workpiece is fixed to a table and is moved in the directions of X and Y in the pattern of a shape to be cut under the commands from a numerical control unit. With the wire extending perpendicularly to the table (workpiece), shapes cut on the workpiece are identical on its upper and lower surfaces. Where the upper guide is displacable in the direction of X and Y (referred to as "U-axis" and "V-axis"), and when the upper guide is displaced in a direction normal to the direction of travel of the workpiece to incline the wire with respect to the workpiece, shapes cut on the upper and lower surfaces of the workpiece become different, forming inclined surfaces cut by the wire, a process known as so-called taper cutting.

Figure 1:
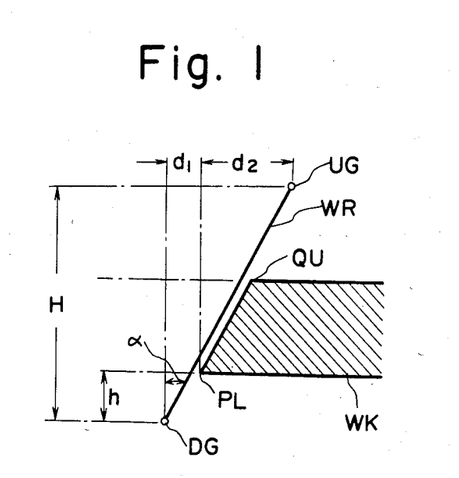
FIGS. 1 and 2 are diagrams illustrative of taper cutting.

FIG. 1 is a diagram illustrative of such taper cutting. A wire WR extends and is kept taut between an upper guide UG and a lower guide DG, the wire being inclined at a given angle with respect to a workpiece WK. Let the lower surface PL of the workpiece WK be of a programmed shape (the upper surface QU of the workpiece WK may alternately be of the programmed shape), the taper angle be $\alpha$, the distance between the upper and lower guides UG, DG be H, and the distance from the lower guide DG to the lower surface of the workpiece WK be h. Then the amount of offset d1 of the lower guide DG with respect to the lower workpiece surface PL and the amount of offset d2 of the upper guide UG with respect to the lower workpiece surface PL can be expressed respectively by:

$$d1 = h \cdot \tan \alpha + d/2 \quad (1)$$
$$d2 = H \cdot \tan \alpha - h \cdot \tan \alpha - d/2 \quad (2)$$
$$= H \cdot \tan \alpha - d1$$

where d is the width of the cut.

Figure 2:
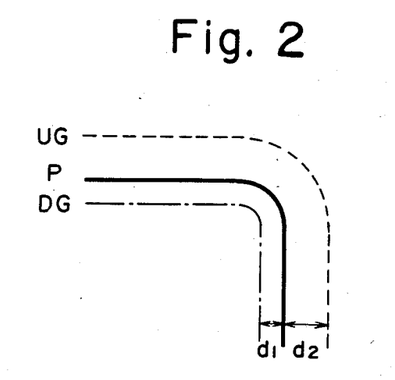

Accordingly, by moving the upper guide UG which supports the wire WR to keep the amounts of offset d1, d2 constant as the workpiece moves, the taper cutting can be carried out with the taper angle $\alpha$, as shown in FIG. 2. The upper and lower guides UG, DG move along a dotted line and a dot-and-dash line, respectively, in FIG. 2. Commands for such wire-cut electric-discharge cutting include a command for a programmed path along the upper or lower workpiece surface, a command for the speed of feed along the programmed path, a command for the taper angle $\alpha$, commands for the distances H, h, and the like for cutting the workpiece according to the commands.

Figure 3:
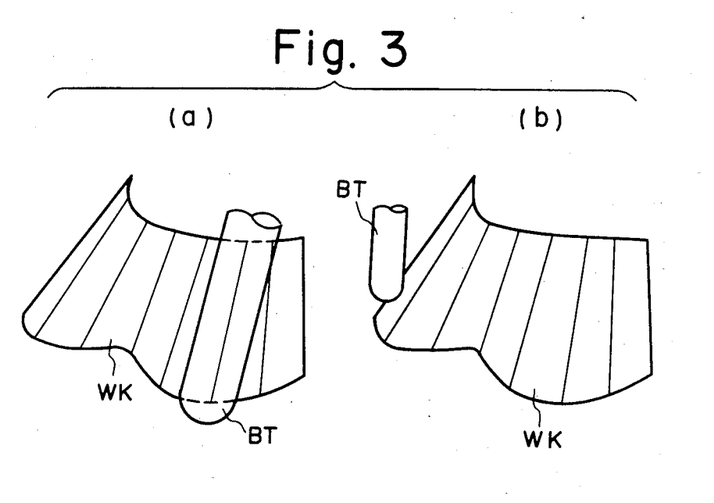
FIG. 3 is a set of diagrams showing milling operations.

With the taper cutting heretofore practiced, the taper angle is fixed, and cutting with continuously variable taper angles cannot be effected. In particular, the workpiece cannot be cut to produce completely different shapes on the upper and lower surfaces of the workpiece. For example, it has been impossible to cut the workpiece along a straight line on the upper surface and along an arcuate line on the lower surface. If wire-cut electric-discharge cutting were capable of such cutting, it would be applicable to cavity cutting such as for blanking dies and plastic dies, and NC wire-cut electric-discharge cutting machines would find a much wider range of applications. If the above wire-cut electric-discharge cutting were rendered possible, it would similarly be possible to use the shank of a milling cutter BT on a milling machine in cutting a workpiece WK as shown in FIG. 3(a), an arrangement which could increase the cutting efficiency as compared with the conventional practice (FIG. 3(b)) which employs only the tip of the milling cutter for workpiece cutting.

With the foregoing in view, it is an object of the present invention to provide a numerically controlled cutting method capable of cutting a curved surface having different upper and lower shapes, that is, a curved surface generated by connecting corresponding points on two curved lines.

SUMMARY OF THE INVENTION

The present invention pertains to a numerically controlled cutting method of cutting a curved surface generated by interconnecting corresponding points on two curved lines. The numerically controlled cutting method employing a milling machine comprises the steps of supplying as inputs curve information specifying said two curved lines, information on the shape of a cutter such as the cutter radius, information on the direction of cutter radius compensation, and division information for dividing the curved surfaces; dividing the curved lines based on said division information to determine dividing points mi, ni (i=1, 2, ...); determining the vectors of normals in said direction of cutter radius compensation at the dividing point mi on one of said curved lines and the dividing point ni on the other curved line which corresponds to the dividing point mi, and computing cutter compensation positions mi', ni' corresponding to the dividing points mi, ni upon cutter position compensation along a cutter offset vector or the directions of the normals using said information on the tool shape; computing a cutter axis direction (I, J, K) from said cutter compensation positions mi', ni'; computing movement data on control axes of a numerically controlled machine tool using coordinates (X, Y, Z) of the cutter compensation position ni' and said tool axis direction (I, J, K); and moving the cutter relatively to a workpiece based on said movement data on the control axes to cut the curved surface. The numerically controlled cutting method employing a wire-cut electric-discharge cutting machine comprises the steps of supplying as inputs curve information specifying said two curves, information on the wire radius including an electric discharge gap in wire-cut electric-discharge cutting, information on the direction of wire compensation, and division information for dividing the curved lines; dividing said curved lines based on said division information and computing dividing points, mi, ni (i=1, 2, ...); computing the vectors of normals in said direction of wire compensation at the dividing point mi on one of the curved lines and at the a corresponding dividing point ni on the other curved line, and computing wire compensation positions mi', ni' corresponding to the dividing points mi, ni upon wire position compensation along a wire offset vector or in the directions of the normals using said information on the wire radius; computing the direction of the wire axis from said wire compensation positions mi', ni'; computing the positions of points m" (U, V), ni" (X, Y) corresponding to the wire compensation positions mi', ni' and lying on planes parallel to a table for placing the workpiece thereon, using said direction of the wire axis, wire compensation positions, and the like; and driving the table in the directions of X, Y based on X, Y, U, V and driving the wire in the directions of U, V to cut the workpiece along the curved surface.

With the present invention, a curved surface generated by successively interconnecting corresponding points on two curved lines, that is, a curved surface having different shapes on the upper and lower surfaces, can be cut, so that a wire-cut electric-discharge cutting machine incorporating the invention can find a wider range of applications. In milling operations, the shank of a milling cutter can be used to cut a workpiece, resulting in a much higher cutting efficiency than that of the conventional cutting method in which the tip end of the milling cutter is employed to cut the workpiece.

DESCRIPTION OF THE PREFERRED EMBODIMENT

An embodiment of the present invention will hereinafter be described in detail with reference to the drawings.

Figure 4:
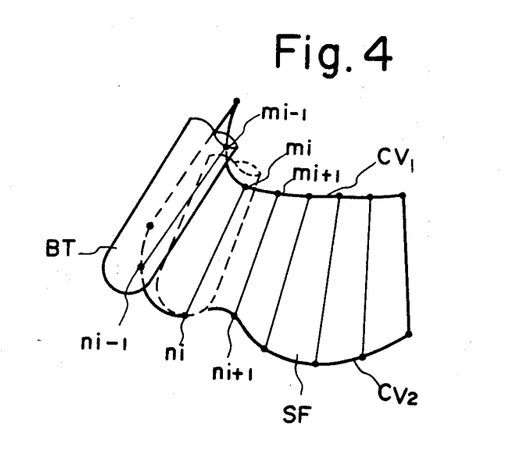
FIG. 4 is a diagram illustrating a milling operation according to the present invention.

FIG. 4 is a diagram illustrative of the manner in which the present invention is applied to milling operations. Designated at BT is a cutter, and CV1, CV2 represent curved lines composed of continued basic shapes such as straight lines and arcs. A desired curved surface SF can be formed by successively interconnecting corresponding points mi, ni (i=1, 2, ...) on the curved lines. The curved line CV1 is indicative of a shape cut on the upper surface of a workpiece, and the curved line CV2 is indicative of a shape cut on the lower surface of the workpiece.

Figure 15:
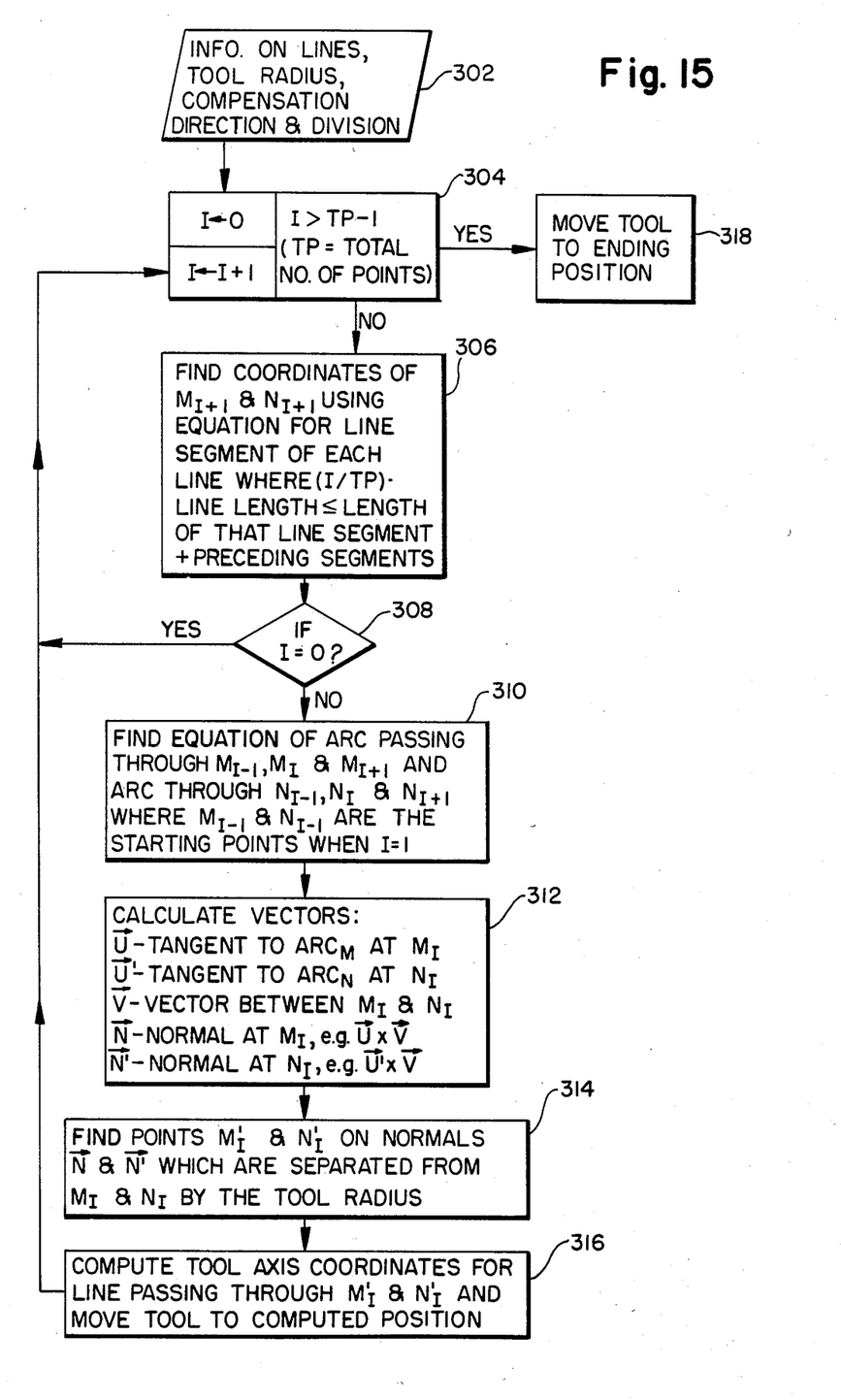

(1) Prior to cutting the curved surface, curve information specifying the two curved lines CV1, CV2, cutter shape information such as the cutter radius r, compensation direction information indicative of which direction, leftward or rightward of the direction of travel of the cutter, cutter radius compensation is to be carried out, and division information for dividing the curved lines CV1, CV2 are supplied as inputs (see block 302 in FIG. 15). The number of divisions, the pitch of the divisions, or an allowable error is supplied as the division information. The cutter radius compensation direction is commanded by G function commands G41, G42; for a leftward offset, the command G41 is supplied, and for a rightward offset, the command G42 is supplied.

(2) Then, the curved lines CV1, CV2 are divided on the basis of the division information given in the step (1) to find dividing points mi, ni (see block 306 in FIG. 15). Assuming that the number of divisions M is given as the division information, the dividing points which divide the curved lines in the ratio of a:b can be determined by the following procedures (2-1) through (2-4) (on the assumption of a+b=M).

The line or the circular arc which constitutes the given curved line is defined as an element. Then the length of each element of the given curved lines CV1 and CV2 is obtained. Finally, the lengths D of the curved lines are obtained by summing the lengths of each element.

$$\frac{a}{(a+b)} D = D' \text{ is determined:} \tag{2-2}$$

(2-3) The element containing the position at the distance D' from one end of the line which serves as a starting point of the line is extracted. The extraction of the element is effected by finding k which satisfies the relationship:

$$\sum_{i=1}^{k-1} Di \leq D' \leq \sum_{i=1}^{k} Di \tag{3}$$

where D1 is the length of the first element, D2 is the length of the second element, and D3, ..., Di are the lengths of successive elements.

(2-4) The point on the kth element from the starting point, which satisfies the following, is found:

$$D'' = D' - \sum_{i=1}^{k-1} Di \tag{4}$$

The point thus determined serves as a point at which the given curve is divided from one end at the ratio of a:b. In (2-3), $$\sum_{i=1}^{k-1} Di = 0 \text{ when } k = 1.$$

When the dividing pitch N (mm) is given as the division information, the dividing points mi, ni are determined by the following procedure:

(2-1)' The lengths D1 (mm), D2 (mm) of the given curved lines CV1, CV2 are found.

(2-2)' The arithmetic operations of M1=D1/N, M2=D2/N are carried out.

(2-3)' M1 and M2 are compared for their magnitudes, and the greater one is used as the dividing number M to effect the steps (2-2) through (2-4), thus defining the dividing points mi, ni.

Figure 5:
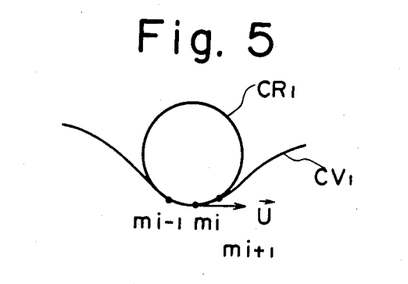
FIGS. 5 and 6 are diagrams illustrative of computation of the vector of a normal.
Figure 6:
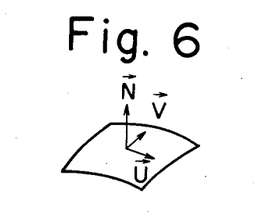

(3) Once the dividing points mi, ni are determined which correspond to each other on the curved lines CV1, CV2, the vectors $\vec{N}, \vec{N}'$ of normals at the dividing points in the direction of cutter radius compensation are computed. The vectors of the normals can be determined by the following procedure with reference to FIGS. 5 and 6:

(3-1) Dividing points $mi-1$, $mi+1$, which are immediately in front of and behind the dividing point $mi$, are found. The front point $mi-1$ has already been computed when the cutter BT has moved to the points $mi-1$, $ni-1$. Therefore, only the dividing point $mi+1$ is computed at this time (see block 306 in FIG. 15).

(3-2) An arc CR1 (FIG. 5) which passes the above three points $mi-1$, $mi$, $mi+1$ is determined, and the vector U of a tangent at the dividing point $mi$ is found (see block 310 in FIG. 15).

(3-3) Then, the vector $\vec{V}$ in the direction of the generator of a curved surface SF is determined from $$\vec{V} = \vec{mi} - \vec{ni} \tag{5}$$

The vector $\vec{N}$ of the normal becomes the outer product of the vector $\vec{U}$ of the tangent and the vector $\vec{V}$ in the direction of the generator (FIG. 6), and the vector $\vec{N}$ of the normal at the dividing point $mi$ can be determined from $$\vec{N} = \vec{V} \times \vec{U} \tag{6}$$

(3-4) Likewise, the vector $\vec{N}'$ of a normal at the dividing point $ni$ is determined. The vectors $\vec{N}, \vec{N}'$ are formed so that they are directed in the offset direction of the cutter. For example, when the tangential vector U at the dividing point $mi$ on the curved line CV1 is determined in a direction opposite to that of the foregoing description, the normal vector $\vec{N}$ is determined by the following:

$$\vec{N} = \vec{U} \times \vec{V} \tag{6'}$$

Figure 7:
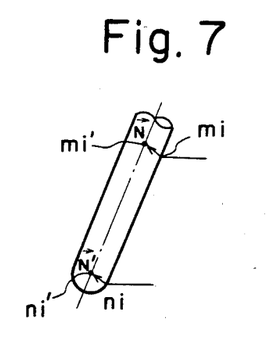
FIG. 7 is a diagram illustrative of the vector of an offset and the vector of a central cutter axis.

(4) Thereafter, the vector of the cutter offset is derived from the cutter radius r and the normal vectors $\vec{N}$, $\vec{N}'$ (see block 314 in FIG. 15). Stated otherwise, positions $mi'$, $ni'$ (FIG. 7) on the central axis of the cutter are determined which correspond to the dividing points $mi$, $ni$ defined when the cutter position is corrected in the normal direction based on the cutter radius. The positions on the central axis of the cutter which correspond to the dividing points $mi$, $ni$ will hereinafter be referred to as "cutter compensation positions".

(5) With the two cutter compensation positions $mi'$, $ni'$ thus determined, the vector $\vec{T}$ of the central axis of the cutter is derived from the following:

$$T = mi' - ni' \tag{7}$$

Figure 8:
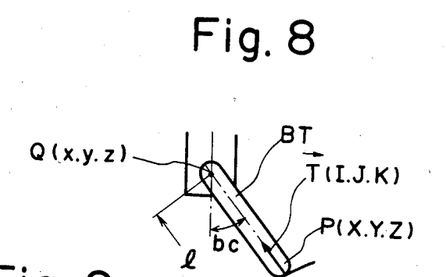
FIGS. 8 and 9 are diagrams illustrating computation of positional data on control axes.
Figure 9:
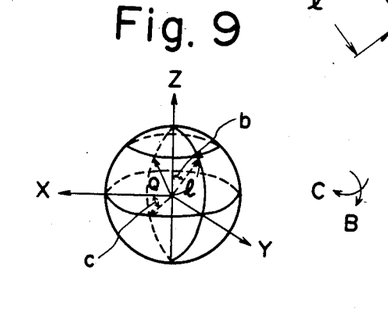

Then, the cutter compensation position $ni'$ is assumed to be a cutter end position P (X, Y, Z), and positional data on the control axes of the numerically controlled machine tool are computed from the vector $\vec{T}$ of the central axis of the cutter and the cutter end position P (X, Y, Z). It is assumed, for example, that a milling machine having five simultaneous axes is employed in which, as shown in FIGS. 8 and 9, the cutter BT is rotated in a vertical direction (B-axis direction) and a horizontal direction (C-axis direction) to control the direction of the central axis of the cutter with respect to the workpiece, and the cutter BT is moved in the directions of the three axes, X, Y, and Z. The orthogonal coordinates (x, y, z) of the center Q of rotation of the tool and the spherical coordinates (b, c) indicative of the angular position of the cutter BT can be computed from the following arithmetic operations based on the vector (I, J, K) of the central axis of the cutter, the coordinates (X, Y, Z) of the position of the cutter end, and the cutter length l:

$$x = X + \frac{I}{\sqrt{I^2 + J^2 + K^2}} \cdot l \tag{8}$$

$$y = Y + \frac{J}{\sqrt{I^2 + J^2 + K^2}} \cdot l \tag{9}$$

$$z = Z + \frac{K}{\sqrt{I^2 + J^2 + K^2}} \cdot l \tag{10}$$

$$b = \tan^{-1}\left(\frac{\sqrt{I^2 + J^2}}{K}\right) \tag{11}$$

$$c = \tan^{-1}\left(\frac{J}{I}\right) \tag{12}$$

The equations (11), (12) are formulas for converting the orthogonal coordinates to the spherical coordinates. More specifically, as shown in FIG. 9, orthogonal coordinate and spherical coordinate systems are assumed with the center Q of rotation of the cutter BT serving as their origin, and the cutter having the length l is rotated by the amount b in the direction of the B-axis (the vertical direction of rotation) and by the amount c in the direction of the C-axis (the horizontal direction of rotation). The orthogonal coordinates (Io, Jo, Ko) of the cutter end can be given by:

$$Io = l \cdot \sin b \cdot \cos c \tag{13}$$

$$Jo = l \cdot \sin b \cdot \sin c \tag{14}$$

$$Ko = l \cdot \cos b \tag{15}$$

By finding b, c from these equations (13) through (15), the equations (11), (12) can be established.

(6) Finally, the values x, y, z, b, c determined from the equations (8) through (12) are employed to move the cutter BT from the dividing point $mi-1$ to the dividing point $mi$ on the curve CV1 and from the dividing point $ni-1$ to the dividing point $ni$ on the curve CV2.

Thereafter, the above steps (1) through (6) are repeated to move the cutter BT along the curves CV1, CV2 to mill the workpiece for generating the desired curved surface SF.

Figure 10:
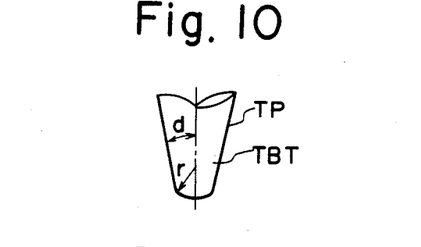
FIG. 10 is a schematic view of a tapered cutter.

Although the cutter compensation position $ni'$ has been described in the step (5) as being the position P (X, Y, Z) of the cutter end, the cutter compensation position may not be limited to the cutter end position. While the cutter has been described as having a constant radius, a tapered cutter TBT having a taper TP as shown in FIG. 10 may be utilized and the cutter compensation positions $mi'$, $ni'$ at $mi$, $ni$ can be determined from cutter radii at respective positions on the tapered cutter.

Although in the foregoing embodiments the present invention has been described as being applied to a five-axis machine tool having the B- and C-axes for the rotation of the cutter, the present invention is also applicable to a five-axis machine tool having a combination of a rotary table and a rotatable cutter or two rotary tables.

The foregoing description has been directed to the milling operation in which the present invention is incorporated.

Figure 11:
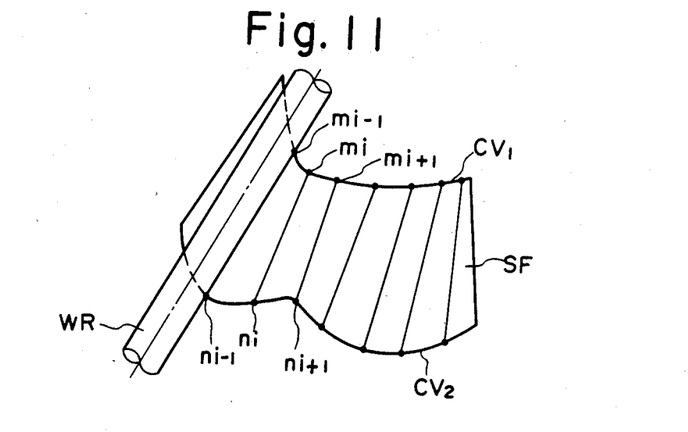
FIGS. 11 and 12 are diagrams illustrative of wire-cut electric-discharge cutting operation according to the present invention.
Figure 12:
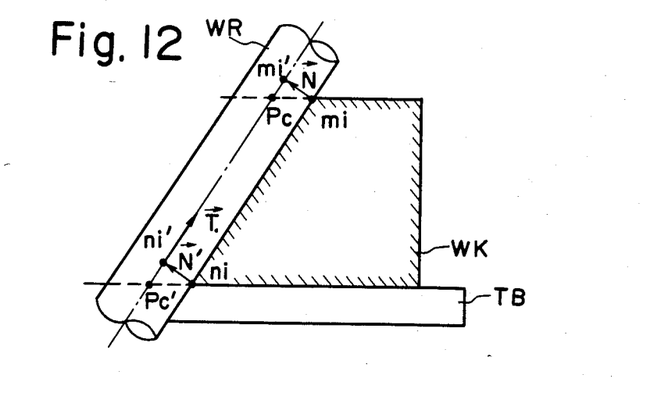

An application in which the present invention is incorporated in a wire-cut electric-discharge cutting operation will now be described. FIGS. 11 and 12 are diagrams explanatory of such a wire-cut electric-discharge cutting operation. Designated at WR is a wire, CV1 and CV2 represent curves of shapes cut on the upper and lower surfaces of a workpiece WK, and SF represents a curved surface.

(1)′ Prior to cutting the curved surface SF, curve information, wire-diameter information including an electric discharge gap, a wire compensation direction, and division information are provided (see block 302 in FIG. 15).

(2)′ Then, the curves CV1, CV2 are divided on the basis of the division information supplied at the step (1)′ to determine dividing points mi, ni (see block 306 in FIG. 15).

(3)′ Thereafter, wire compensation positions mi′, ni′ (FIG. 12) are determined in the same way as the steps (3), (4) for the milling operation (blocks 312-314 in FIG. 15). The cutter in the steps (3), (4) should be read as the wire.

(4)′ Once the two wire compensation positions mi′, ni′ are found, the inclined vector T of the wire is determined from the equation (7).

(5)′ Then, the coordinates of points on planes parallel to the table TB supporting the workpiece WK and onto which the wire compensation points mi′, ni′ are projected, that is, the coordinates of points Pc, Pc′ where the center line of the wire WR intersects the planes parallel to the table TB, are computed (FIG. 12). Assuming that the upper guide of the wire-cut electric-discharge cutting machine is moved along the upper surface of the workpiece in the directions of U- and V-axes, the point Pc becomes a point where the plane of the upper surface of the workpiece intersects the center of the wire, and the point Pc′ becomes a point where the plane of the lower surface of the workpiece intersects the center of the wire. The coordinates (u, v), (x, y) of the points Pc, Pc′ can be given by:

$$u = Sx + t \cdot I \brace v = Sy + t \cdot J \quad (16)$$

$$x = Sx' + t' \cdot I \brace y = Sy' + t' \cdot J \quad (17)$$

where d, d′ are the coordinates on the Z-axis of the dividing points mi, ni; (I, J, K) is the inclined vector $\vec{T}$ of the wire; (Sx, Sy, Sz), (Sx′, Sy′, Sz′) are the coordinates of the wire compensation positions mi′, ni′; and t, t′ are expressed by:

$$t = (d - Sz)/K \quad (18)$$

$$t' = (d' - Sz')/K \quad (19)$$

(6)′ Finally, the upper guide of the wire-cut electric-discharge cutting machine is moved in the directions of the U- and V-axes based on the (u, v) determined by the equation (16), and the table is moved in the direction of the X- and Y-axes based on the (x, y) determined by the equation (17). The wire can thus be moved from the dividing point mi−1 to the dividing point mi on the curve CV1, and from the dividing point ni−1 to the dividing point ni on the curve CV2. Thereafter, the above steps (1)′ through (6)′ are repeated to move the wire along the curves CV1, CV2 to cut the workpiece for generating the desired curved surface SF.

Figure 13:
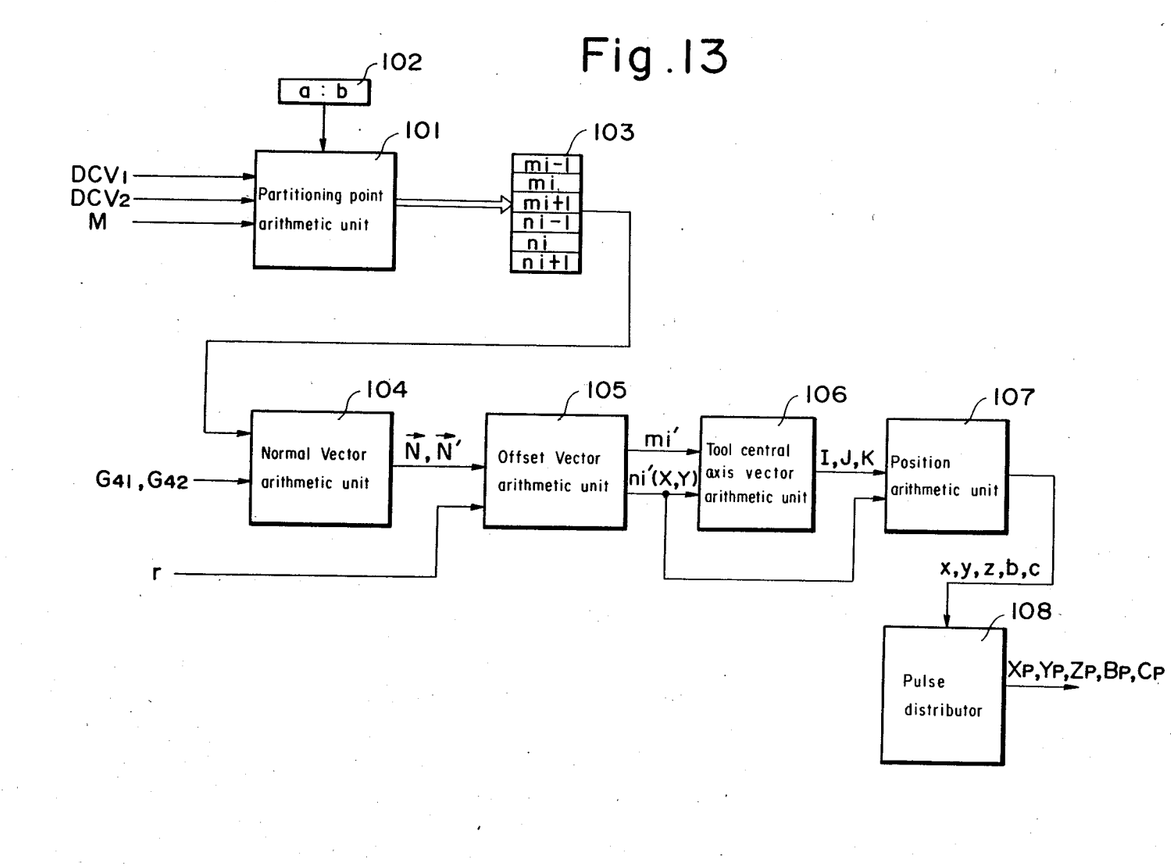
FIG. 13 is a block diagram of a control for milling operations.

FIG. 13 is a block diagram of a control for milling operations according to the present invention.

Designated at 101 is an arithmetic unit for computing dividing points, the arithmetic unit being supplied with curve data DCV1, DCV2 specifying the curved lines CV1, CV2, the dividing number M, and the dividing ratio a:b for computing the coordinates of the dividing points mi, ni. Designated at 102 is a register for storing the dividing ratio, the content of the register being renewable when the arithmetic operations of:

$$a+1 \to a, \quad M-a \to b$$

are carried out each time the foregoing steps (1) through (6) are completed. The values are initialized at the start as a=1 and b=M−1. A register 103 serves to store the coordinates of dividing points, that is, the current dividing points mi−1, ni−1 where the cutter is presently positioned, the dividing points mi, ni to which the cutter is moved next, and the dividing points mi+1, ni+1 to which the cutter is then moved. An arithmetic unit 104 serves to compute the vectors of normals, that is, the vectors $\vec{N}, \vec{N'}$ of normals at the dividing points mi, ni at the steps (3-1) through (3-4) using the information on the direction of cutter radius compensation given by the G function command. An arithmetic unit 105 serves to compute the vector of an offset from the cutter radius r and the normal vectors $\vec{N}, \vec{N'}$, that is, the coordinates of the cutter compensation position mi′, ni′ which correspond to the dividing points mi, ni when the cutter radius compensation is effected. An arithmetic unit 106 serves to compute the vector T (I, J, K) of the central axis of the cutter based on equation (7). Designated at 107 is an arithmetic unit for computing positional data on control axes, the arithmetic unit 107 being supplied with the vector (I, J, K) of the central axis of the cutter and the coordinates (X, Y) of the cutter end position for computing and delivering the positional data x, y, z, b, c of the X-, Y- and Z-axes, and the B- and C-axes. A pulse distributer 108 is supplied with the positional data x, y, z, b, c for carrying out known arithmetic operations for pulse distribution to generate pulses Xp, Yp, Zp, Bp, Cp distributed respectively to the axes. The distributed pulses are supplied to servo circuits (not shown) for the axes, respectively, for driving motors to move the cutter along the curved lines CV1, CV2.

Figure 14:
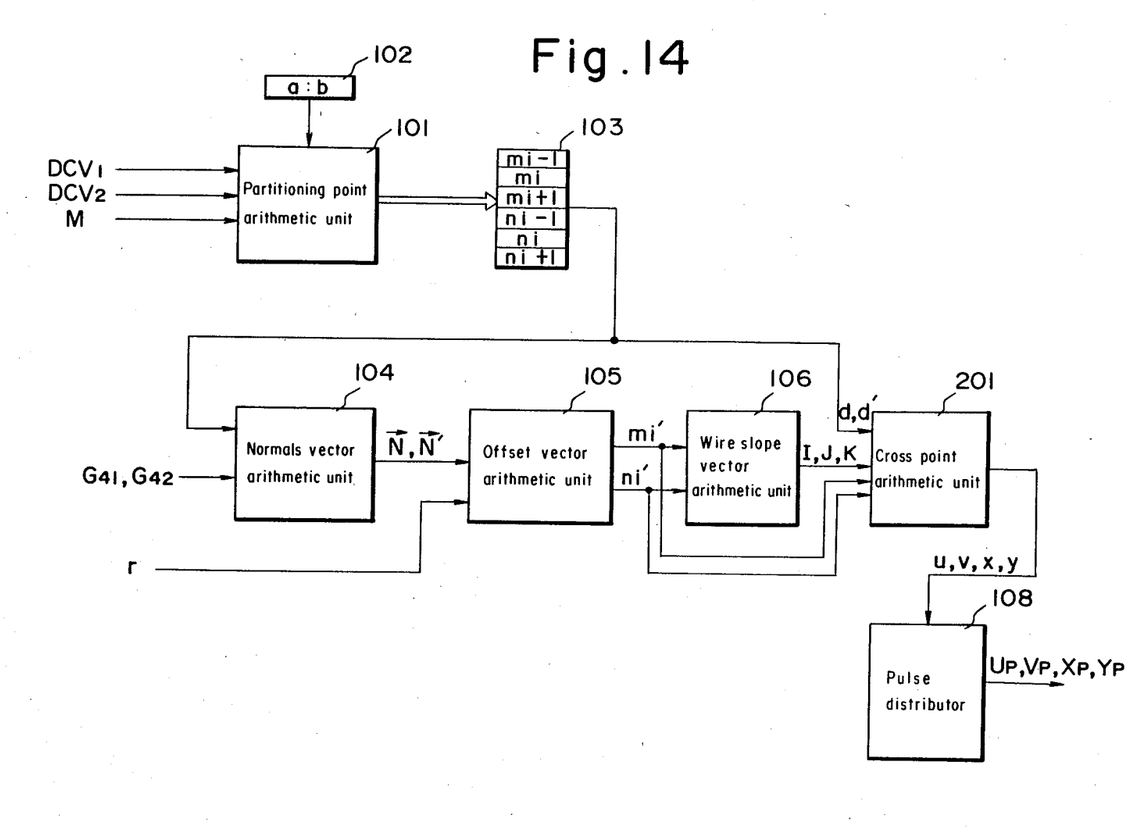
FIG. 14 is a block diagram of a control for wire-cut electric-discharge cutting operations and FIG. 15 is a flowchart of the basic steps of a method according to the present invention.

FIG. 14 is a block diagram of a control for wire-cut electric-discharge cutting operations according to the present invention. Identical parts in FIG. 14 are denoted by identical reference characters in FIG. 13, and their detailed description will be omitted.

Designated at 201 is an arithmetic unit for computing the coordinates of points Pc, Pc′ of intersection (FIG. 12) based on the equations (16), (17) and delivering the coordinates to a pulse distributor 108. The pulse distributor 108 is supplied with u, v, x, y to generate pulses Up, Vp distributed respectively to the U- and V-axes and pulses Xp, Yp distributed respectively to the X- and Y-axes. The upper guide and the table are driven on the basis of the distributed pulses.

While in FIGS. 13, 14 the control is composed of individual units, it may comprise a computer.

With the numerically controlled cutting method according to the present invention, as described above, a curved surface can be cut which is generated by successively interconnecting corresponding points on two curved lines, and wire-cut electric-discharge cutting machines can find a wider range of applications. In milling operations, the shank of the milling cutter can be used to cut a workpiece, resulting in a much higher cutting efficiency than that of the conventional cutting process in which the tip end of the milling cutter is employed to cut a workpiece.

What is claimed is:

1. A numerically controlled cutting method of cutting a curved surface which is generated by interconnecting corresponding points on two curved lines, comprising the steps of:

supplying as inputs curve information specifying the two curved lines, information on the shape of a cutter such as cutter radius, information on the direction of cutter radius compensation, and division information for dividing the curved lines;

dividing the curved lines based on said division information to determine dividing points mi, ni (i=1, 2, ...);

determining the vectors of normals in said direction of cutter radius compensation at the dividing point mi on one of the curved lines and at the corresponding dividing point ni on the other curved line, and computing cutter compensation positions mi', ni' corresponding to the dividing points mi, ni upon cutter position compensation along the directions of the normals using said information on the shape of the cutter;

computing a cutter axis direction (I, J, K) from said cutter compensation positions mi', ni';

computing movement data on control axes of a numerically controlled machine tool using coordinates (X, Y, Z) of the cutter compensation position ni' and said cutter axis direction (I, J, K); and moving the cutter relative to a workpiece based on said movement data on the control axes to cut the curved surface.

2. A numerically controlled cutting method according to claim 1, wherein said moving the cutter relative to the workpiece comprises the step of computing movement data x, y, z along orthogonal coordinate axes and movement data b, c, in vertical and horizontal directions of rotation, out of said movement data on the control axes, according to the following equations:

$$x = X + \frac{I}{\sqrt{I^2 + J^2 + K^2}} \cdot l$$

$$y = Y + \frac{J}{\sqrt{I^2 + J^2 + K^2}} \cdot l$$

$$z = Z + \frac{K}{\sqrt{I^2 + J^2 + K^2}} \cdot l$$

$$b = \tan^{-1}\left(\frac{\sqrt{I^2 + J^2}}{K}\right)$$

$$c = \tan^{-1}\left(\frac{J}{I}\right)$$

where l is the length of the cutter.

3. A numerically controlled cutting method of cutting a curved surface which is generated by interconnecting corresponding points on two curved lines, comprising the steps of:

supplying as inputs curve information specifying the two curved lines, information on wire radius including an electric discharge gap in wire-cut electric-discharge cutting, information on the direction of wire compensation, and division information for dividing the curved lines;

dividing the curved lines based on said division information and computing dividing points mi, ni (i=1, 2, ...);

computing the vectors of normals in said direction of wire compensation at the dividing point mi on one of the curved lines and at the other dividing point ni corresponding to the dividing point mi, and computing wire compensation positions mi', ni' corresponding to the dividing points mi, ni upon wire position compensation in the directions of the normals using said information on the wire radius;

computing the direction of the wire axis from said wire compensation positions mi', ni';

computing the positions of points mi" (u, v), ni" (x, y) corresponding to the wire compensation positions mi', ni' and lying on planes parallel to a table for placing a workpiece thereon, using said direction of the wire axis, said wire compensation positions; and driving the table in the directions of X, Y based on x, y and driving the wire in the directions of U, V based on u, v to cut the workpiece along the curved surface.

4. A numerically controlled cutting method according to claim 3, wherein said computing the positions of said points mi", ni" comprises the step of computing the coordinates (u, v), (x, y) of said points mi", ni" according to the following equations:

$$u = Sx + t \cdot I$$

$$v = Sy + t \cdot J$$

$$x = Sx' + t' \cdot I$$

$$y = Sy' + t' \cdot j$$

where $t = (d - Sz)/K$, $t' = (d' - Sz')/K$, and d, d' are coordinates on the Z-axis of said dividing points mi, ni.

5. A numerically controlled cutting method for taper cutting a workpiece along a predetermined curved surface, which intersects a first plane on a first side of the workpiece along a first curved line and which intersects a second plane on a second side of the workpiece and parallel to the first plane along a second curved line, using an elongated cutter having an axis, said method comprising the steps of:

dividing the first curved line into segments which intersect each other at dividing points mi (i=1, 2, ...) and dividing the second curved line into corresponding segments which intersect each other at corresponding dividing points ni (i=1, 2, ...);

for each pair of dividing points mi, ni, determining a corresponding pair of cutter compensation positions mi', ni' lying in a plane which is substantially normal to said predetermined curve and which passes through the dividing points mi and ni, the compensation positions mi′, ni′ being spaced apart from the dividing points mi, ni so as to lie on the axis of said cutter when the dividing points mi, ni lie substantially on the periphery of said cutter;

when the axis of the cutter passes through the compensation positions mi−1′, ni−1′, moving the cutter with respect to the workpiece so as to bring the axis of the cutter to a position passing through the compensation positions mi′, ni′; and repeatedly moving the cutter with respect to the workpiece until the predetermined curved surface is cut.

6. The method of claim 5, wherein said cutter is a milling cutter and wherein the step of moving the cutter with respect to the workpiece so as to bring the axis of the cutter to a position passing through the compensation positions mi′, ni′ comprises the steps of determining a cutter axis direction parallel to a line running through mi′ and ni′ and moving the cutter with respect to the workpiece until a predetermined point on the axis of the cutter substantially coincides with one of mi′ and ni′ and the axis of the cutter lies substantially parallel to the line running through mi′ and ni′.

7. The method of claim 5, wherein said cutter is the wire electrode of a wire-cut electric discharge machine having a movably mounted wire guide and wherein the step of determining a pair of cutter compensation positions mi′, ni′ additionally comprises the step of finding the points Pc and Pc′ which lie along a line running through mi′ and ni′ and which lie respectively on said first and second planes.

* * * * *

UNITED STATES PATENT AND TRADEMARK OFFICE
CERTIFICATE OF CORRECTION

PATENT NO. : 4,559,601

DATED : December 17, 1985

INVENTOR(S) : Kishi et al.

It is certified that error appears in the above-identified patent and that said Letters Patent is hereby corrected as shown below:

Col. 2, line 64, delete "the" (second occurrence).

Col. 4, line 19, before "The" insert -- 2-1) --;
       line 27, before equation insert -- 2-2) --;
       ":" should be --.--; delete "(2-2)".

Col. 5, line 14, " U " should be -- $\vec{U}$ --;
       line 31, " U " should be -- $\vec{U}$ --;
       line 53, " T " should be -- $\vec{T}$ --.

Col. 7, line 27, " T " should be -- $\vec{T}$ --.

Signed and Sealed this

Twenty-second Day of April 1986

[SEAL]

Attest:

DONALD J. QUIGG

Attesting Officer     Commissioner of Patents and Trademarks